US009004692B2

(12) United States Patent
Akiyama

(10) Patent No.: US 9,004,692 B2
(45) Date of Patent: Apr. 14, 2015

(54) PROJECTOR HAVING DIFFUSING UNIT AND POLARIZATION CONVERSION ELEMENT

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 13/599,574

(22) Filed: Aug. 30, 2012

(65) Prior Publication Data

US 2013/0057832 A1    Mar. 7, 2013

(30) Foreign Application Priority Data

Sep. 7, 2011   (JP) ................................. 2011-194661
Mar. 9, 2012   (JP) ................................. 2012-052621

(51) Int. Cl.
*G03B 21/20* (2006.01)
*G02B 27/09* (2006.01)
*H04N 9/31* (2006.01)

(52) U.S. Cl.
CPC .......... *G03B 21/208* (2013.01); *G02B 27/0944* (2013.01); *G03B 21/2073* (2013.01); *H04N 9/3152* (2013.01); *H04N 9/3167* (2013.01)

(58) Field of Classification Search
CPC .............. G03B 21/20; G03B 21/2066; G03B 21/2073; G03B 21/208; G02B 5/02; G02B 5/0231; G02B 5/0252; G02B 5/30; G02B 5/3066; G02B 27/09; G02B 27/0938; G02B 27/0944; H04N 5/72; H04N 9/31; H04N 9/3152; H04N 9/3167
USPC ............. 353/20, 30–31, 33–34, 82, 98, 37–3, 353/988; 359/483.01, 485.01, 359/485.06–485.07, 489.01, 359/489.07–489.08, 558, 566, 574
See application file for complete search history.

(56) References Cited

U.S. PATENT DOCUMENTS

| 5,566,367 | A | 10/1996 | Mitsutake et al. |
| 5,863,125 | A * | 1/1999 | Doany ............................ 353/84 |
| 6,513,934 | B1 * | 2/2003 | Okuyama ........................ 353/31 |
| 6,542,298 | B1 * | 4/2003 | Aoki ......................... 359/485.03 |
| 6,592,224 | B2 * | 7/2003 | Ito et al. ........................... 353/20 |
| 6,594,090 | B2 * | 7/2003 | Kruschwitz et al. .......... 359/707 |
| 6,728,020 | B2 * | 4/2004 | Akitaka ......................... 359/256 |
| 6,764,182 | B2 * | 7/2004 | Ito et al. ........................... 353/20 |
| 6,786,604 | B2 * | 9/2004 | Aastuen et al. ................. 353/20 |
| 6,816,290 | B2 * | 11/2004 | Mukawa ........................ 359/15 |
| 7,011,412 | B2 * | 3/2006 | Ogawa et al. ................... 353/20 |
| 7,520,642 | B2 * | 4/2009 | Holman et al. ............... 362/328 |
| 7,529,024 | B1 * | 5/2009 | Chen ........................ 359/485.01 |

(Continued)

FOREIGN PATENT DOCUMENTS

JP    A-11-202129    7/1999
JP    A-2002-49007    2/2002

(Continued)

*Primary Examiner* — Jori S Reilly-Diakun
(74) *Attorney, Agent, or Firm* — Oliff PLC

(57) ABSTRACT

A projector includes an illumination device having a light source device emitting light, and a polarization conversion element adapted to emit light from the light source device as polarized light, a light modulation device adapted to modulate the light from the illumination device in accordance with image information, and a projection optical system adapted to project the light from the light modulation device, and the illumination device further includes a light diffusing unit disposed in at least one of upstream and downstream of the polarization conversion element.

15 Claims, 15 Drawing Sheets

(56) References Cited

U.S. PATENT DOCUMENTS

| | | | |
|---|---|---|---|
| 7,922,331 B2 * | 4/2011 | Sakai | 353/20 |
| 8,279,523 B2 * | 10/2012 | Yamada et al. | 359/485.04 |
| 8,469,515 B2 * | 6/2013 | Yamauchi et al. | 353/20 |
| 2002/0036728 A1 * | 3/2002 | Okumura | 349/61 |
| 2004/0080938 A1 * | 4/2004 | Holman et al. | 362/231 |
| 2004/0130681 A1 * | 7/2004 | Aastuen et al. | 353/20 |
| 2005/0111240 A1 * | 5/2005 | Yonekubo | 362/617 |
| 2005/0185140 A1 * | 8/2005 | Matsubara et al. | 353/20 |
| 2006/0082699 A1 * | 4/2006 | Gehlsen et al. | 349/61 |
| 2006/0152931 A1 * | 7/2006 | Holman | 362/297 |
| 2007/0030415 A1 * | 2/2007 | Epstein | 349/64 |
| 2007/0127350 A1 * | 6/2007 | Fukutomi et al. | 369/112.16 |
| 2007/0165189 A1 * | 7/2007 | Kawase et al. | 353/31 |
| 2007/0216869 A1 | 9/2007 | Kawase et al. | |
| 2008/0049191 A1 * | 2/2008 | Endo | 353/22 |
| 2008/0316431 A1 * | 12/2008 | Okuyama et al. | 353/20 |
| 2010/0091247 A1 | 4/2010 | Yamamoto | |
| 2011/0292350 A1 * | 12/2011 | Kasazumi et al. | 353/31 |
| 2013/0215392 A1 * | 8/2013 | Lin | 353/8 |

FOREIGN PATENT DOCUMENTS

| | | |
|---|---|---|
| JP | A-2003-241145 | 8/2003 |
| JP | A-2007-248794 | 9/2007 |
| JP | A-2010-91927 | 4/2010 |

* cited by examiner

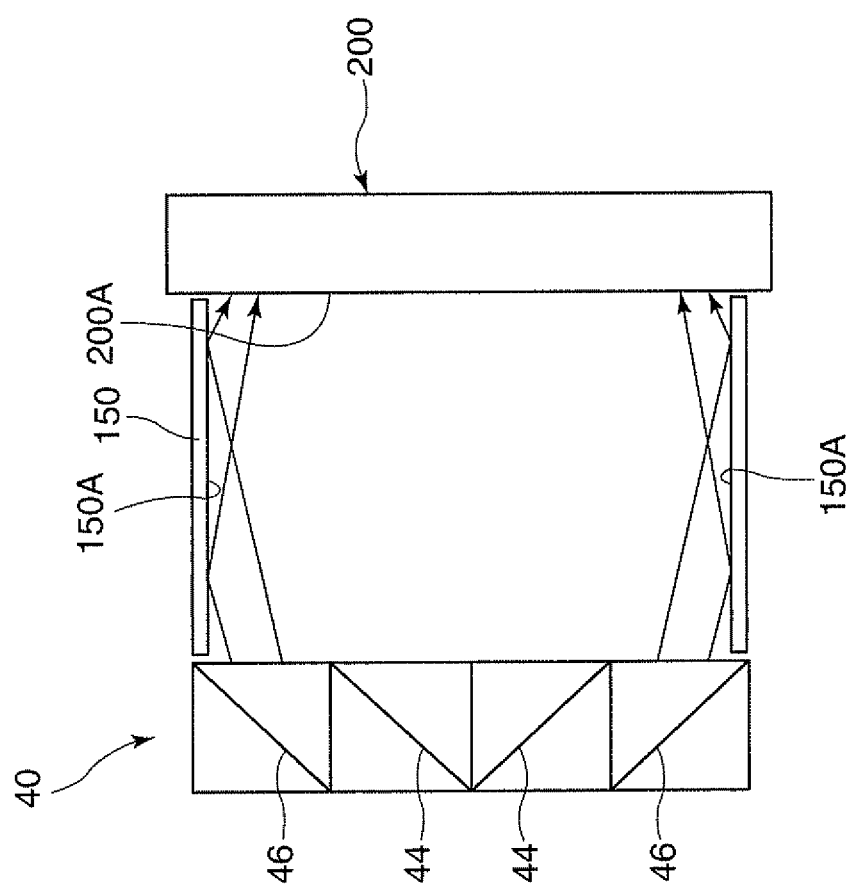

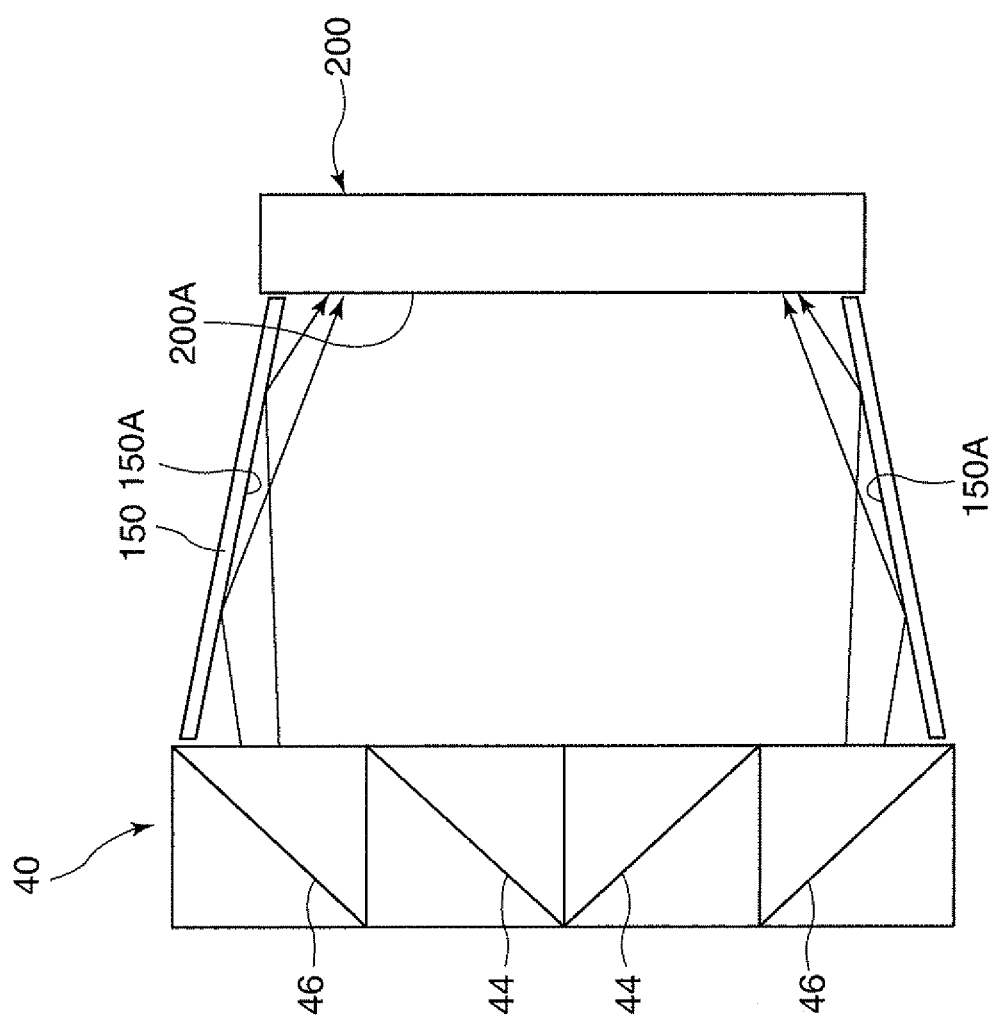

PROJECTOR HAVING DIFFUSING UNIT AND POLARIZATION CONVERSION ELEMENT

BACKGROUND

1. Technical Field

The present invention relates to a projector.

2. Related Art

In the past, there has been known a projector provided with an illumination device including a light source device for emitting light and a polarization conversion element for converting the light from the light source device and then emitting it as polarized light, a reflective-type light modulation device for modulating the light from the illumination device in accordance with image information, and a projection optical system for projecting the light from the light modulation device (see, e.g., JP-A-2010-91927). According to the projector in the related art, it becomes possible to project the image corresponding to the image information using the light from the illumination device.

Incidentally, in recent years, there has been demanded an extremely down-sized projector (a so-called pico projector), which is small in size and light in weight, and used alone or while incorporated in other equipment.

Therefore, when considering modification of an existing projector into the pico projector, it is possible to consider a projector without an integrator optical system.

However, the inventors of the invention have found out the fact that in the projector without the integrator optical system described above, there arises a problem that an illumination unevenness occurs in a projection image projected on a screen.

SUMMARY

An advantage of some aspects of the invention is to provide a projector capable of reducing the phenomenon that the illumination unevenness occurs in the projection image projected on the screen.

As a result of repeated devoted research, the inventors of the invention have found the fact that the light entering the polarization conversion element is blocked by a discontinuous portion of the polarization conversion element as the cause of the phenomenon that the illumination unevenness occurs in the projection image projected on the screen in the projector without the integrator optical system described above. (see a comparative example described later). Therefore, as a result of further repeated research, the inventors of the invention have conceived to dispose a light diffusion section for diffusing the light in at least one of upstream of the polarization conversion element and downstream of the polarization conversion element, and thus have gotten to complete the invention. The invention can be implemented as the following aspects.

[1] An aspect of the invention is directed to a projector including an illumination device having a light source device emitting light, and a polarization conversion element adapted to emit light from the light source device as polarized light, a light modulation device adapted to modulate the light from the illumination device in accordance with image information, and a projection optical system adapted to project the light from the light modulation device, wherein the illumination device further includes a light diffusing unit disposed in at least one of upstream and downstream of the polarization conversion element.

Therefore, according to the projector of this aspect of the invention, since there is further provided the light diffusing unit disposed in at least one of the upstream and the downstream of the polarization conversion element, it becomes possible to reduce the influence of the discontinuous portions of the polarization conversion element, and thus it becomes possible to reduce the phenomenon that the illumination unevenness occurs in the projection image projected on the screen.

Further, according to the projector related to this aspect of the invention, since no integrator optical system is provided, reduction in size and weight can be achieved. As a result, it becomes possible to obtain a projector suitable for achieving a Pico projector.

[2] In the projector according to the above aspect of the invention, it is preferable that the polarization conversion element has a configuration of one-dimensionally arranging a plurality of polarization conversion sections, each having a polarization separation section and a reflecting section, and the light diffusing unit diffuses the light along a direction in which the plurality of polarization conversion sections is arranged one-dimensionally.

By adopting such a configuration, it becomes possible to mix the light not blocked by the discontinuous portions of the polarization conversion element and the light blocked by the discontinuous portions of the polarization conversion element with each other, and thus it becomes possible to reduce the illumination unevenness occurring in a direction perpendicular to the direction in which the plurality of polarization conversion sections is arranged one-dimensionally. As a result, it becomes possible to reduce the phenomenon that the illumination unevenness occurs in the projection image projected on the screen. Further, by adopting such a configuration, by diffusing the light only in the direction in which the plurality of polarization conversion sections is arranged one-dimensionally, it becomes possible to reduce the influence of the discontinuous portions of the polarization conversion element without substantially dropping the light intensity of the illumination device compared to the light intensity in the case of diffusing the light in all directions.

[3] In the projector according to the above aspect of the invention, it is preferable that the light diffusing unit has a plurality of light diffusing sections each extending in a direction, which is perpendicular to an optical axis of the illumination device and is perpendicular to the direction in which the plurality of polarization conversion sections is arranged one-dimensionally, and disposed on at least one of a surface of the light diffusing unit facing to the light source device and a surface of the light diffusing unit facing to the light modulation device, and one of the plurality of light diffusing sections has a roughly semicircular cross-sectional shape viewed in a cross-section perpendicular to the direction in which the one of the light diffusing sections extends.

By adopting such a configuration, it becomes possible to efficiently mix the light not blocked by the discontinuous portions of the polarization conversion element and the light blocked by the discontinuous portions of the polarization conversion element with each other. As a result, it becomes possible to further reduce the phenomenon that the illumination unevenness occurs in the projection image projected on the screen.

It should be noted that in the present specification the "roughly semicircular shape" does not denote only the strictly semicircular shape, but denotes one including shapes similar to a circle such as an ellipse.

[4] In the projector according to the above aspect of the invention, it is preferable that the light diffusing unit has a plurality of light diffusing sections each extending in a direction, which is perpendicular to an optical axis of the illumination device and is perpendicular to the direction in which the plurality of polarization conversion sections is arranged one-dimensionally, and disposed on at least one of a surface of the light diffusing unit facing to the light source device and a surface of the light diffusing unit facing to the light modulation device, and one of the plurality of light diffusing sections has a triangular cross-sectional shape viewed in a cross-section perpendicular to the direction in which the one of the light diffusing sections extends.

Also by adopting such a configuration, it becomes possible to efficiently mix the light not blocked by the discontinuous portions of the polarization conversion element and the light blocked by the discontinuous portions of the polarization conversion element with each other. As a result, it becomes possible to further reduce the phenomenon that the illumination unevenness occurs in the projection image projected on the screen.

[5] In the projector according to the above aspect of the invention, it is preferable that the light diffusing unit has a plurality of light diffusing sections each extending in a direction, which is perpendicular to an optical axis of the illumination device and is perpendicular to the direction in which the plurality of polarization conversion sections is arranged one-dimensionally, and disposed on at least one of a surface of the light diffusing unit facing to the light source device and a surface of the light diffusing unit facing to the light modulation device, and one of the plurality of light diffusing sections has a rectangular cross-sectional shape viewed in a cross-section perpendicular to the direction in which the one of the light diffusing sections extends.

Also by adopting such a configuration, it becomes possible to efficiently mix the light not blocked by the discontinuous portions of the polarization conversion element and the light blocked by the discontinuous portions of the polarization conversion element with each other. As a result, it becomes possible to further reduce the phenomenon that the illumination unevenness occurs in the projection image projected on the screen.

[6] In the projector according to the above aspect of the invention, it is preferable that the plurality of light diffusing sections is arranged at regular intervals along the direction in which the plurality of polarization conversion sections is arranged one-dimensionally.

By adopting such a configuration, it becomes possible to easily manufacture the light diffusing unit. Further, it becomes possible to efficiently mix the light not blocked by the discontinuous portions of the polarization conversion element and the light blocked by the discontinuous portions of the polarization conversion element with each other.

[7] In the projector according to the above aspect of the invention, it is preferable that the plurality of light diffusing sections is arranged at random intervals along the direction in which the plurality of polarization conversion sections is arranged one-dimensionally.

By adopting such a configuration, it becomes possible to efficiently mix the light not blocked by the discontinuous portions of the polarization conversion element and the light blocked by the discontinuous portions of the polarization conversion element with each other.

[8] In the projector according to the above aspect of the invention, it is preferable that the number of the plurality of light diffusing sections is equal to or larger than twice of the number of the polarization conversion sections.

By adopting such a configuration, it becomes possible that the light not blocked by the discontinuous portions of the polarization conversion element and the light blocked by the discontinuous portions of the polarization conversion element out of the light entering the polarization conversion element can more efficiently mixed with each other. As a result, it becomes possible to dramatically reduce the phenomenon that the illumination unevenness occurs in the projection image projected on the screen.

[9] In the projector according to the above aspect of the invention, it is preferable that the polarization conversion element has the two polarization conversion sections.

By adopting such a configuration, the optical system for dividing the light from the light source device into a plurality of light beams in accordance with the arrangement of the polarization separation sections, and then collecting the light beams thus divided to the corresponding polarization separation sections can be eliminated. Therefore, it becomes possible to achieve further reduction in size and weight of the projector compared to the projectors provided with more than two polarization conversion sections. As a result, it becomes possible to obtain a projector more suitable for achieving a pico projector.

[10] In the projector according to the above aspect of the invention, it is preferable to further include a reflecting unit adapted to reflect the light, which proceeds toward outside of an irradiation area of the light modulation device, to inside of the irradiation area, and disposed between the polarization conversion element and the light modulation device.

According to this configuration, the light proceeding toward the outside of the irradiation area out of the light emitted from the polarization conversion element is reflected toward the inside of the irradiation area in mid-course, and it becomes possible to illuminate the periphery of the irradiation area with the reflected light. Thus, the illumination unevenness in which the periphery of the irradiation area is darker can be eliminated.

[11] In the projector according to the above aspect of the invention, it is preferable that the reflecting unit has a prismatic cylindrical shape having an inner surface formed as a reflecting surface, and is disposed so that one opening section faces to a light exit surface of the polarization conversion element and the other opening section faces to the irradiation area of the light modulation device.

In this configuration, since the medium of the reflected light is air having relatively long air-equivalent optical path length, the display shadow of the discontinuous portions of the polarization conversion element can be prevented from appearing in the irradiation area.

[12] In the projector according to the above aspect of the invention, it is preferable that an aperture area of the one opening section of the reflecting unit is larger than an aperture area of the other opening section.

According to this configuration, the intensity of the illumination light in the irradiation area can be raised.

[13] In the projector according to the above aspect of the invention, it is preferable that at least a part of the reflecting surface of the reflecting unit has a scattering property.

According to this configuration, since the light having entered the reflecting surface is reflected in diverse directions, it becomes possible to uniformly illuminate the periphery or the like of the irradiation area, using these reflected lights, without the unevenness.

[14] In the projector according to the above aspect of the invention, it is preferable that the polarization conversion element includes a polarization separation section adapted to transmit a first linearly polarized component and reflect a second linearly polarized component among the polarization components included in the incident light having entered the polarization conversion element, a reflecting section adapted to reflect the second linearly polarized component, which has been reflected by the polarization separation section, in a direction parallel to a transmission direction of the first linearly polarized component, and a wave plate adapted to convert one of the first linearly polarized component and the second linearly polarized component into the other of the first linearly polarized component and the second linearly polarized component, and a reflectance of the second linearly polarized component in the polarization separation section is higher than a transmittance of the first linearly polarized component in the polarization separation section.

Since the second linearly polarized component is reflected by the polarization separation section, and is then reflected by the reflecting section to thereby be emitted in the same direction as the first linearly polarized component, the optical path length of the second linearly polarized component is longer than the optical path length of the first linearly polarized component. Since the longer the optical path length of the illumination light is, the lower the brightness level in the irradiation area is to following the law of illumination, if the transmittance of the first linearly polarized component in the polarization separation section is made equal to the reflectance of the second linearly polarized component in the polarization separation section, the brightness of the irradiation area corresponding to the second linearly polarized component becomes lower than the brightness of the irradiation area corresponding to the first linearly polarized component. In this aspect of the invention, since the reflectance of the second linearly polarized component in the polarization separation section is set to be higher than the transmittance of the first linearly polarized component in the polarization separation section, it is possible to approximate the brightness in the irradiation area corresponding to the second linearly polarized component to the brightness in the irradiation area corresponding to the first linearly polarized component. Therefore, it is possible to realize the roughly uniform brightness throughout the entire irradiation area.

[15] In the projector according to the above aspect of the invention, it is preferable that a difference between the reflectance of the second linearly polarized component in the polarization separation section and the transmittance of the first linearly polarized component in the polarization separation section is higher than 0% and lower than 15%.

According to this configuration, the brightness of the irradiation area corresponding to the second linearly polarized component and the brightness of the irradiation area corresponding to the first linearly polarized component are further uniformized.

BRIEF DESCRIPTION OF THE DRAWINGS

The invention will be described with reference to the accompanying drawings, wherein like numbers reference like elements.

FIG. 7 is a diagram showing a substantial part of a projector according to a fifth embodiment of the invention.

FIG. 8 is a diagram showing a modified example of the fifth embodiment.

DESCRIPTION OF EXEMPLARY EMBODIMENTS

Hereinafter, a projector according to an embodiment of the invention will be explained based on the embodiments shown in the accompanying drawings.

First Embodiment

Figure 1A:
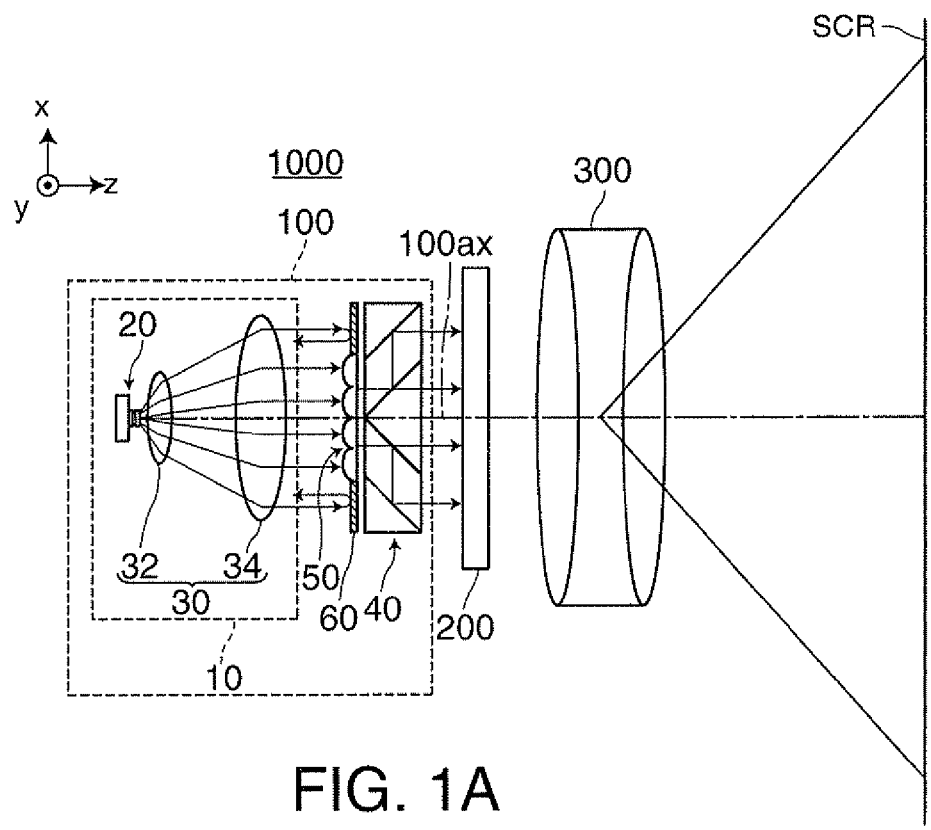
FIGS. 1A and 1B are diagrams for explaining a projector according to a first embodiment of the invention.
Figure 1B:
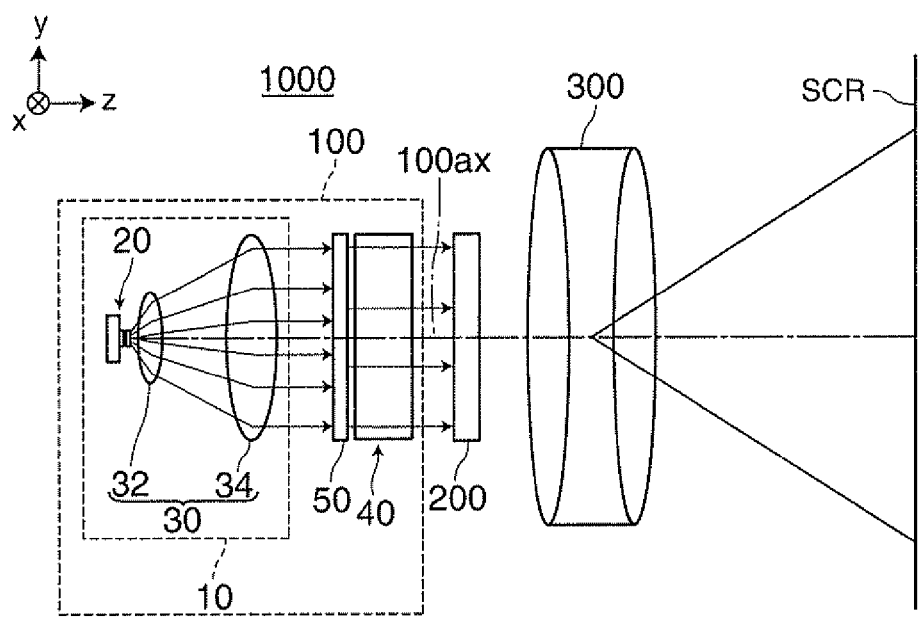

FIGS. 1A and 1B are diagrams showing a projector 1000 according to a first embodiment for the purpose of an explanation thereof. FIG. 1A is a plan view showing an optical system of the projector 1000, and FIG. 1B is a side view showing the optical system of the projector 1000. It should be noted that in FIGS. 1A and 1B, the arrows shown between a white light emitting diode 20 and a liquid crystal light modulation device 200 are for roughly indicating the flow of the light. Further, a recycle mirror is not shown in FIG. 1B. The same applies to FIG. 2B described later.

It should be noted that in the drawings for explaining an optical system and optical elements, three directions perpendicular to each other are indicated as a z-axis direction (a direction of an optical axis (an illumination light axis) $100ax$ of an illumination device 100 in FIG. 1A), an x-axis direction (a direction parallel to the sheet and perpendicular to the z axis in FIG. 1A), and a y-axis direction (a direction perpendicular to both of the sheet and the z axis in FIG. 1A), respectively.

Figure 2A:
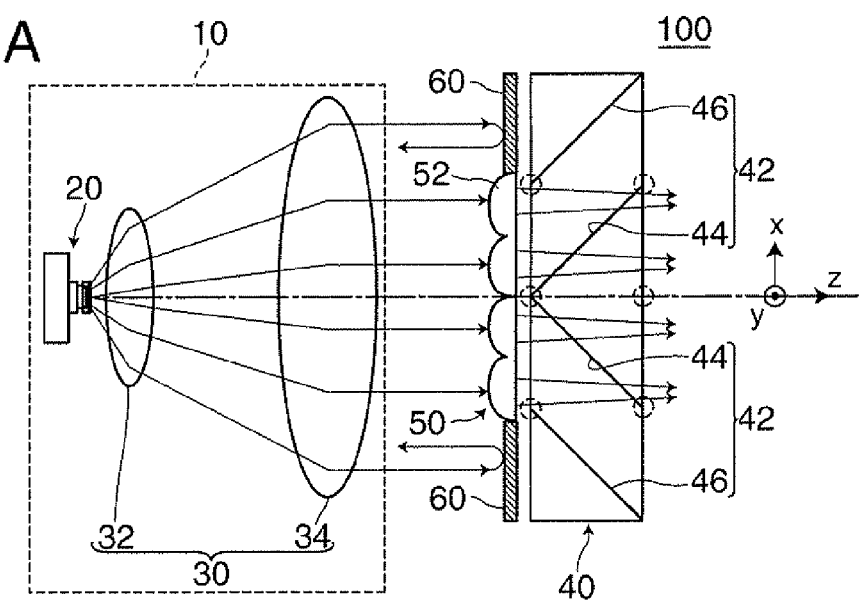
FIGS. 2A through 2C are diagrams for explaining an illumination device in the first embodiment.
Figure 2B:
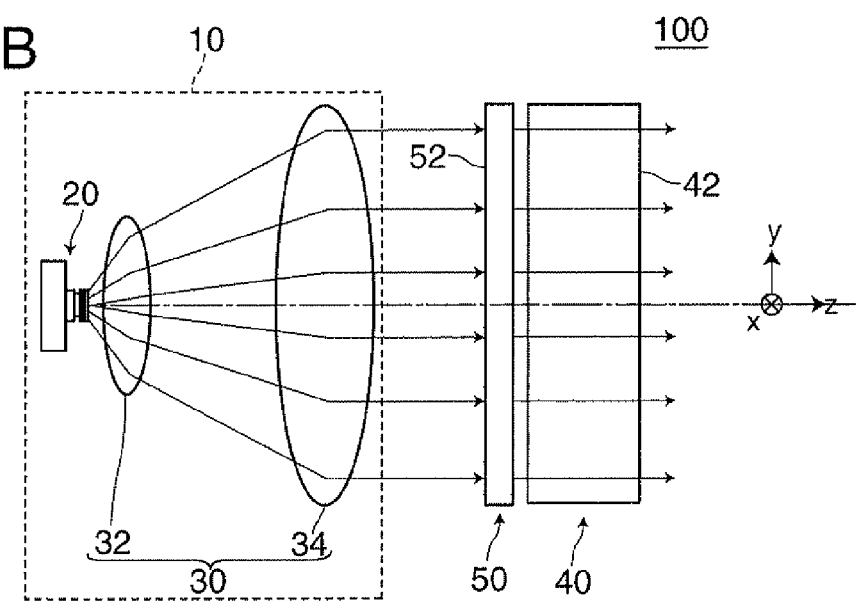
Figure 2C:
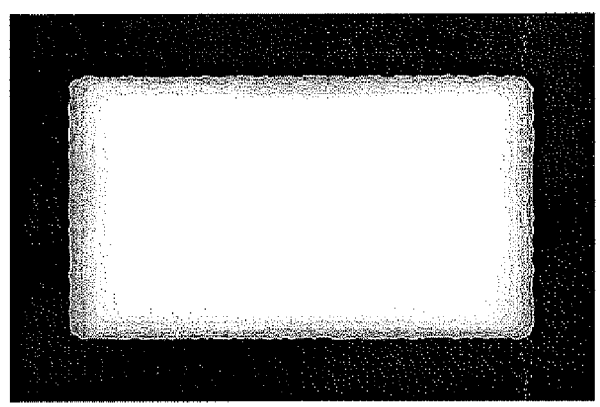

FIGS. 2A through 2C are diagrams showing the illumination device 100 in the first embodiment for the purpose of an explanation thereof. FIG. 2A is a plan view showing the illumination device 100 in the first embodiment in an enlarged manner, FIG. 2B is a side view showing the illumination device 100 in the first embodiment in an enlarged manner, and FIG. 2C is a diagram showing a light intensity distribution of a projection image projected on a screen. It should be noted that the portions indicated by dotted circles in FIG. 2A show discontinuous portions of the polarization conversion element. The same applies to FIGS. 3A, 4 through 6, 12 through 15 described later.

As shown in FIG. 1A, the projector 1000 according to the first embodiment is provided with the illumination device 100, a liquid crystal light modulation device 200, and a projection optical system 300. The projector 1000 projects a full-color image using red light, green light, and blue light. Further, the projector 1000 is a single-panel projector provided with one liquid crystal light modulation device 200, which is a transmissive light modulation device, as a light modulation device.

The illumination device 100 is provided with a light source device 10, a polarization conversion element 40, alight diffusing unit 50, and a recycle mirror 60. The illumination device 100 emits light (i.e., the light, which can be used as white light) including the red light, the green light, and the blue light as illumination light.

The light source device 10 is a light source device for emitting parallel light, and is provided with a white light emitting diode 20 as a light source, and a collimating optical system 30.

The white light emitting diode 20 is a light emitting diode of a Lambertian emission type, and emits the light including the red light, the green light, and the blue light. It should be noted that in the projector according to the embodiment of the invention, it is also possible to use a plurality of white light emitting diodes.

The collimating optical system 30 is an optical element for collimating the light from the white light emitting diode 20, and is composed of two collimator lenses (a first lens 32 and a second lens 34) as shown in FIGS. 1A, 1B, 2A, and 2B. The collimating optical system 30 emits the light having a roughly uniform luminous density distribution. It should be noted that the number of lenses constituting the collimating optical system 30 can be one, or more than two.

The polarization conversion element 40 is polarization conversion element having a configuration in which a plurality of polarization conversion sections 42, each having one polarization separation section 44 and one reflecting section 46, arranged one-dimensionally, and for performing the polarization conversion on the light from the light source device 10. The polarization conversion element 40 in the present embodiment has two polarization conversion sections 42. Specifically, as shown in FIG. 2A, the two polarization conversion sections 42 are arranged one-dimensionally so that the polarization separation section 44 provided to one of the two polarization conversion sections 42 and the polarization separation section 44 of the other of the two polarization conversion sections 42 are adjacent to each other. Hereinafter, the direction in which the plurality of polarization conversion sections 42 is arranged one-dimensionally is referred to as an arrangement direction of the polarization conversion sections 42.

The polarization conversion sections 42 each have the polarization separation section 44 for transmitting one linearly polarized component out of the polarization components included in the incident light without modification while reflecting the other linearly polarized component in a direction perpendicular to the illumination light axis 100$ax$, the reflecting section 46 for reflecting the other linearly polarized component, which is reflected by the polarization separation section 44, in a direction parallel to the illumination light axis 100$ax$, and a wave plate (not shown) for converting the other linearly polarized component reflected by the reflecting section 46 into the one linearly polarized component.

The light diffusing unit 50 is a film-like optical element disposed in the upstream of the polarization conversion element 40, namely on the light source device 10 side of the polarization conversion element 40, and for diffusing the light along the arrangement direction (the x-axis direction) of the polarization conversion sections 42.

As shown in FIGS. 2A and 2B, the light diffusing unit 50 has a plurality of light diffusing sections 52 on the surface of the light diffusing unit 50 facing to the light source device 10, each of the light diffusing sections 52 extending in a direction (the y-axis direction) perpendicular to the optical axis 100$ax$ of the illumination device 100 and perpendicular to the arrangement direction (the x-axis direction) of the polarization conversion sections 42. As shown in FIG. 2A, one of the plurality of light diffusing sections 52 has a roughly semicircular cross-sectional shape viewed in the cross-section perpendicular to the direction in which the one light diffusing section extends.

The one light diffusing section is, for example, a cylindrical lens extending in the y-axis direction.

The plurality of light diffusing sections 52 is arranged at regular intervals along the arrangement direction (the x-axis direction) of the polarization conversion sections 42. Further, the number of the light diffusing sections 52 is twice as large as the number of the polarization conversion sections 42. By diffusing the light entering the polarization conversion element 40 using the plurality of light diffusing sections 52, it becomes possible to reduce the influence of the discontinuous portions of the polarization conversion element 40 on the light entering the polarization conversion element, and as shown in FIG. 2C, it becomes possible to reduce the phenomenon that the illumination unevenness occurs in the projection image projected on the screen. It should be noted that it is also preferable that the number of the light diffusing sections 52 is larger than double of the number of the polarization conversion sections 42.

The recycle mirror 60 has a function of returning the light entering end portions of the polarization conversion element 40 to the light source device 10. By returning the light entering the end portions of the polarization conversion element 40 to the light source device 10 using the recycle mirror 60, it becomes possible to improve the light efficiency of the illumination device 100.

The liquid crystal light modulation device 200 is a light modulation device for modulating the light from the illumination device 100 in accordance with the image information to thereby form a full-color image. As shown in FIGS. 1A and 1B, the liquid crystal light modulation device 200 is disposed in an immediately downstream of the polarization conversion element 40. By adopting such a configuration, it becomes possible to reduce loss of light intensity and a variation in the polarization direction, and as a result, it becomes possible to further improve the light efficiency.

The liquid crystal light modulation device 200 has a color filter not shown. The color filter is formed of a Bayer arrangement color filter having a reflective dichroic filter, and has a function as a color separation optical system for separating the light from the illumination device 100 into the red light, the green light, and the blue light pixel by pixel. It should be noted that other color separation optical systems can also be used as the color separation optical system.

Further, the liquid crystal light modulation device 200 further includes an entrance side polarization plate (not shown) disposed on the polarization conversion element 40 side, and an exit side polarization plate (not shown) disposed on the projection optical system 300 side. The entrance side polarization plate, the liquid crystal light modulation device 200, and the exit side polarization plate perform the light modulation of the respective colored lights having been input therein.

The liquid crystal light modulation device itself is a transmissive liquid crystal light modulation device obtained by encapsulating a liquid crystal as an electro-optic material between a pair of transparent glass substrates, and modulates the polarization direction of a single kind of linearly polarized light emitted from the entrance side polarization plate in accordance with image information provided thereto using, for example, polysilicon TFTs as switching elements.

The full-color image emitted from the liquid crystal light modulation device 200 is projected by the projection optical system 300 to form a projection image on the screen SCR.

As described above, according to the projector 1000 related to the first embodiment, since there is provided the light diffusing unit 50 disposed in the upstream of the polarization conversion element 40, it becomes possible to reduce the influence of the discontinuous portions of the polarization conversion element 40, and thus it becomes possible to reduce the phenomenon that the illumination unevenness occurs in the projection image projected on the screen.

Further, according to the projector 1000 related to the first embodiment, since no integrator optical system is provided, reduction in size and weight can be achieved. As a result, it becomes possible to obtain a projector suitable for achieving a pico projector.

Further, according to the projector 1000 related to the first embodiment, the polarization conversion element 40 has a configuration in which a plurality of polarization conversion sections 42, each having one polarization separation section 44 and one reflecting section 46, arranged one-dimensionally, and the light diffusing unit 50 diffuses the light along the arrangement direction (the x-axis direction) of the polarization conversion sections 42. Therefore, it becomes possible to mix the light not blocked by the discontinuous portions of the polarization conversion element 40 and the light blocked by the discontinuous portions of the polarization conversion element 40 with each other, and thus it becomes possible to reduce the illumination unevenness occurring in a direction (the y-axis direction) perpendicular to the arrangement direction (the x-axis direction) of the polarization conversion sections 42. As a result, it becomes possible to reduce the phenomenon that the illumination unevenness occurs in the projection image projected on the screen. Further, according to the projector 1000 related to the first embodiment, by diffusing the light only in the arrangement direction (the x-axis direction) of the polarization conversion sections 42, it becomes possible to reduce the influence of the discontinuous portions of the polarization conversion element 40 without substantially dropping the light intensity of the illumination device 100 compared to the light intensity in the case of diffusing the light in all directions.

Further, according to the projector 1000 related to the first embodiment, it becomes possible to efficiently mix the light not blocked by the discontinuous portions of the polarization conversion element 40 and the light blocked by the discontinuous portions of the polarization conversion element 40 with each other. As a result, it becomes possible to further reduce the phenomenon that the illumination unevenness occurs in the projection image projected on the screen.

Further, according to the projector 1000 related to the first embodiment, since the plurality of light diffusing sections 52 is arranged at regular intervals along the arrangement direction (the x-axis direction) of the polarization conversion sections 42, it becomes possible to easily manufacture the light diffusing unit 50. Further, it becomes possible to efficiently mix the light not blocked by the discontinuous portions of the polarization conversion element 40 and the light blocked by the discontinuous portions of the polarization conversion element 40 with each other.

Further, according to the projector 1000 related to the first embodiment, since the number of the light diffusing sections 52 is twice as large as the number of the polarization conversion sections 42, it becomes possible to more efficiently mix the light not blocked by the discontinuous portions of the polarization conversion element 40 and the light blocked by the discontinuous portions of the polarization conversion element 40 with each other. As a result, it becomes possible to dramatically reduce the phenomenon that the illumination unevenness occurs in the projection image projected on the screen.

Further, according to the projector 1000 related to the first embodiment, the polarization conversion element 40 has the two polarization conversion sections 42. Specifically, as shown in FIG. 2A, the two polarization conversion sections 42 are arranged one-dimensionally so that the polarization separation section 44 provided to one of the two polarization conversion sections 42 and the polarization separation section 44 of the other of the two polarization conversion sections 42 are adjacent to each other. According to this configuration, the area where the light enters the polarization conversion element 40 is an area overlapping the two polarization separation sections 44 adjacent to each other in a plan view when viewed from the z-axis direction. According to the configuration described above, the optical system for dividing the light from the light source device 10 into a plurality of light beams in accordance with the arrangement of the polarization separation sections 44, and then collecting the light beams thus divided to the corresponding polarization separation sections 44 can be eliminated. Therefore, it becomes possible to achieve further reduction in size and weight of the projector compared to the projectors provided with more than two polarization conversion sections. As a result, it becomes possible to obtain a projector more suitable for achieving a pica projector.

Comparative Example

Figure 3A:
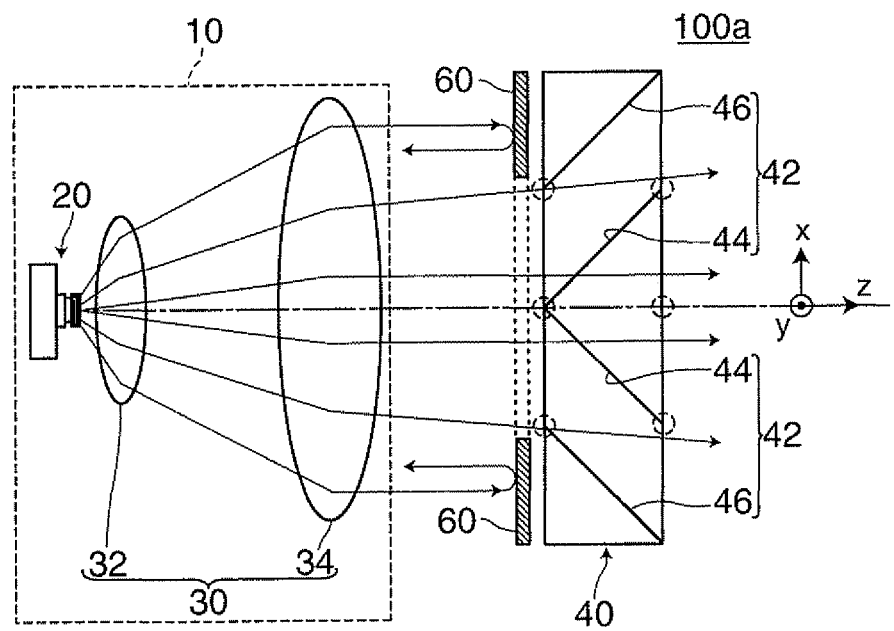
FIGS. 3A and 3B are diagrams for explaining an illumination device in a comparative example.
Figure 3B:
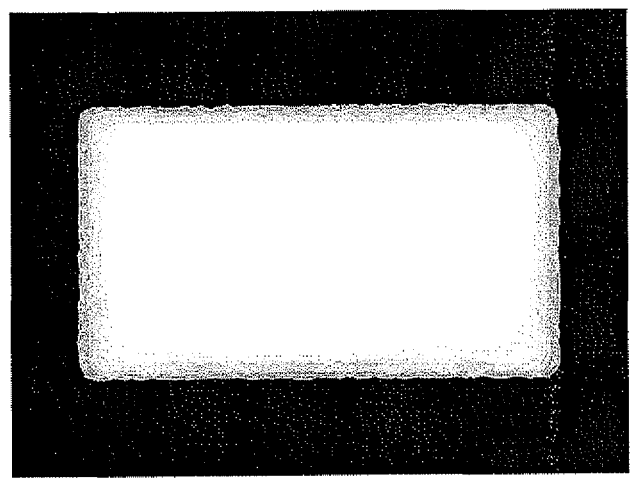

FIGS. 3A and 3B are diagrams for explaining an illumination device 100a in a comparative example. FIG. 3A is a plan view showing the illumination device 100a in the comparative example in an enlarged manner, and FIG. 3B is a diagram showing the light intensity distribution of the projection image projected on the screen.

A projector 1000a (not shown) according to the comparative example basically has a configuration substantially the same as that of the projector 1000 according to the first embodiment. However, since the illumination device 100a is not provided with the light diffusing unit, the light entering the polarization conversion element 40 is blocked by the discontinuous portions of the polarization conversion element 40, and it is not achievable to reduce the influence of the discontinuous portions of the polarization conversion element 40. As a result, as shown in FIG. 3B, the illumination unevenness occurs in the projection image projected on the screen in a direction (the y-axis direction) perpendicular to the arrangement direction (the x-axis direction) of the polarization conversion sections 42.

Second Embodiment

Figure 4:
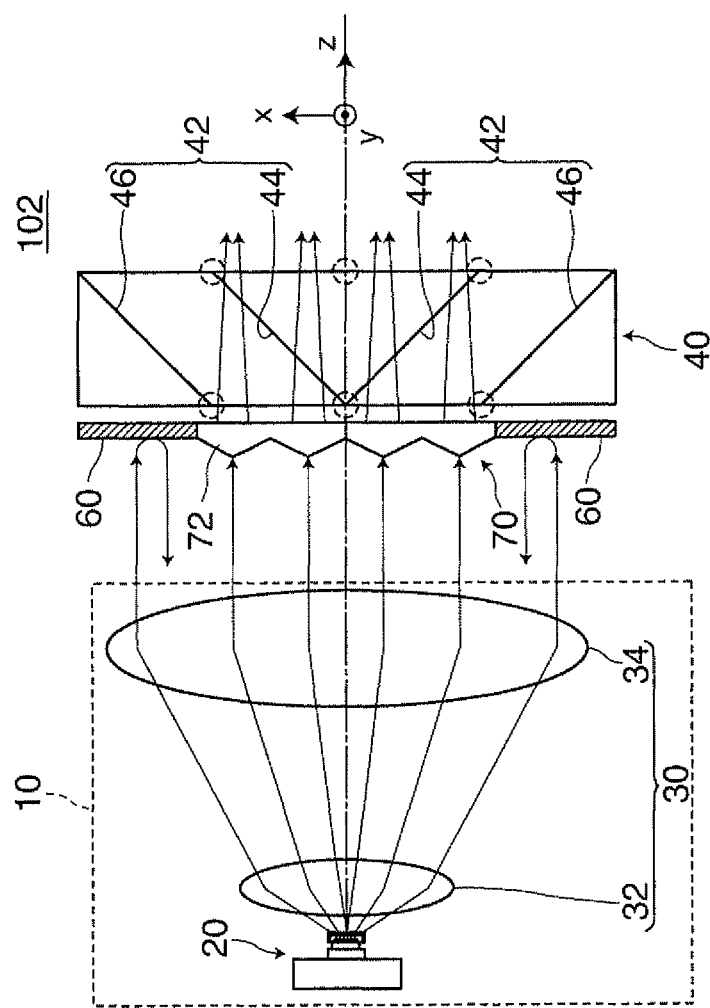
FIG. 4 is a diagram for explaining an illumination device in a second embodiment of the invention.

FIG. 4 is a diagram for explaining an illumination device 102 in a second embodiment.

A projector 1002 (not shown) according to the second embodiment basically has a configuration substantially the same as that of the projector 1000 according to the first embodiment, but is different from the projector 1000 according to the first embodiment in the configuration of the light diffusing unit. As shown in FIG. 4, the light diffusing unit 70 has a plurality of light diffusing sections 72. The light diffusing sections 72 are each different in cross-sectional shape from the light diffusing section 52 in the first embodiment. Specifically, one of the plurality of light diffusing sections 72 has a triangular cross-sectional shape viewed in the cross-section perpendicular to the direction in which the one light diffusing section extends.

As described above, according to the projector 1002 related to the second embodiment, similarly to the projector 1000 according to the first embodiment, since there is provided the light diffusing unit 70 disposed in the upstream of the polarization conversion element 40, it becomes possible to reduce the influence of the discontinuous portions of the polarization conversion element 40, and thus it becomes possible to reduce the phenomenon that the illumination unevenness occurs in the projection image projected on the screen.

Further, according to the projector 1002 related to the second embodiment, similarly to the projector 1000 according to the first embodiment, it becomes possible to efficiently mix the light not blocked by the discontinuous portions of the polarization conversion element 40 and the light blocked by the discontinuous portions of the polarization conversion element 40 with each other. As a result, it becomes possible to further reduce the phenomenon that the illumination unevenness occurs in the projection image projected on the screen.

It should be noted that the projector 1002 according to the second embodiment has substantially the same configuration as that of the projector 1000 according to the first embodiment except for the configuration of the light diffusing unit, and therefore, obtains the corresponding advantages out of the advantages exerted by the projector 1000 according to the first embodiment without change.

Third Embodiment

Figure 5:
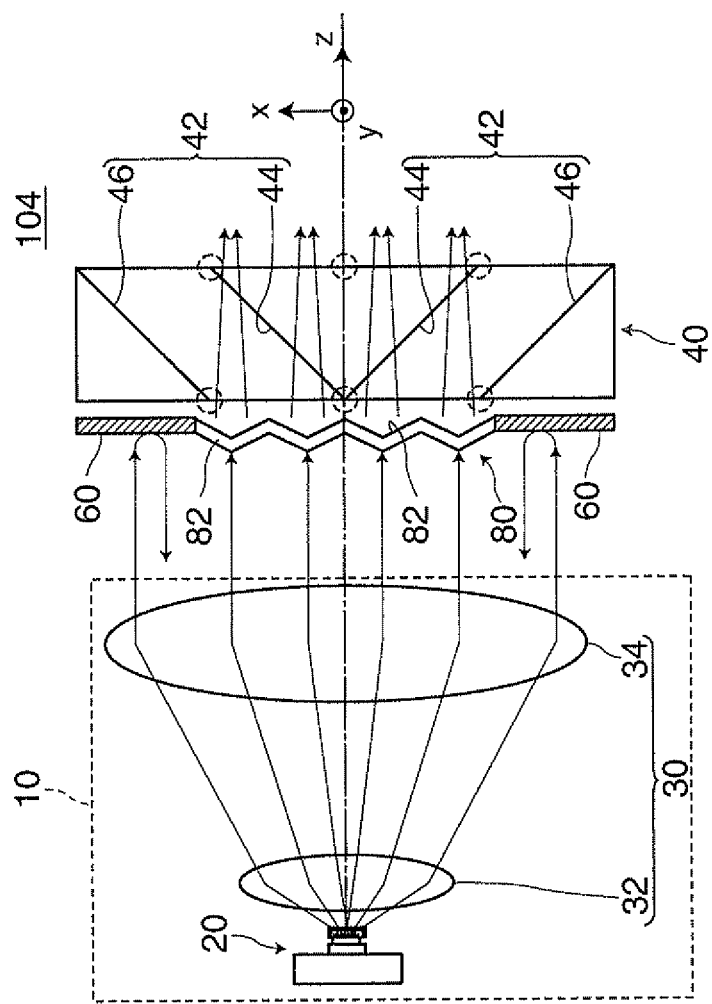
FIG. 5 is a diagram for explaining an illumination device in a third embodiment of the invention.

FIG. 5 is a diagram for explaining an illumination device 104 in a third embodiment.

A projector 1004 (not shown) according to the third embodiment basically has a configuration substantially the same as that of the projector 1000 according to the first embodiment, but is different from the projector 1000 according to the first embodiment in the configuration of the light diffusing unit. Specifically, as shown in FIG. 5, the light diffusing unit 80 has a plurality of light diffusing sections 82 on the surface of the light diffusing unit 80 facing to the light source device 10 and the surface of the light diffusing unit 80 facing to the light modulation device 200. One of the plurality of light diffusing sections 82 has a triangular cross-sectional shape viewed in the cross-section perpendicular to the direction in which the one light diffusing section extends.

As described above, according to the projector 1004 related to the third embodiment, similarly to the projector 1000 according to the first embodiment, since there is provided the light diffusing unit 80 disposed in the upstream of the polarization conversion element 40, it becomes possible to reduce the influence of the discontinuous portions of the polarization conversion element 40, and thus it becomes possible to reduce the phenomenon that the illumination unevenness occurs in the projection image projected on the screen.

Further, according to the projector 1004 related to the third embodiment, similarly to the projector 1000 according to the first embodiment, it becomes possible to efficiently mix the light not blocked by the discontinuous portions of the polarization conversion element 40 and the light blocked by the discontinuous portions of the polarization conversion element 40 with each other. As a result, it becomes possible to further reduce the phenomenon that the illumination unevenness occurs in the projection image projected on the screen.

It should be noted that the projector 1004 according to the third embodiment has substantially the same configuration as that of the projector 1000 according to the first embodiment except for the configuration of the light diffusing unit, and therefore, obtains the corresponding advantages out of the advantages exerted by the projector 1000 according to the first embodiment without change.

Fourth Embodiment

Figure 6:
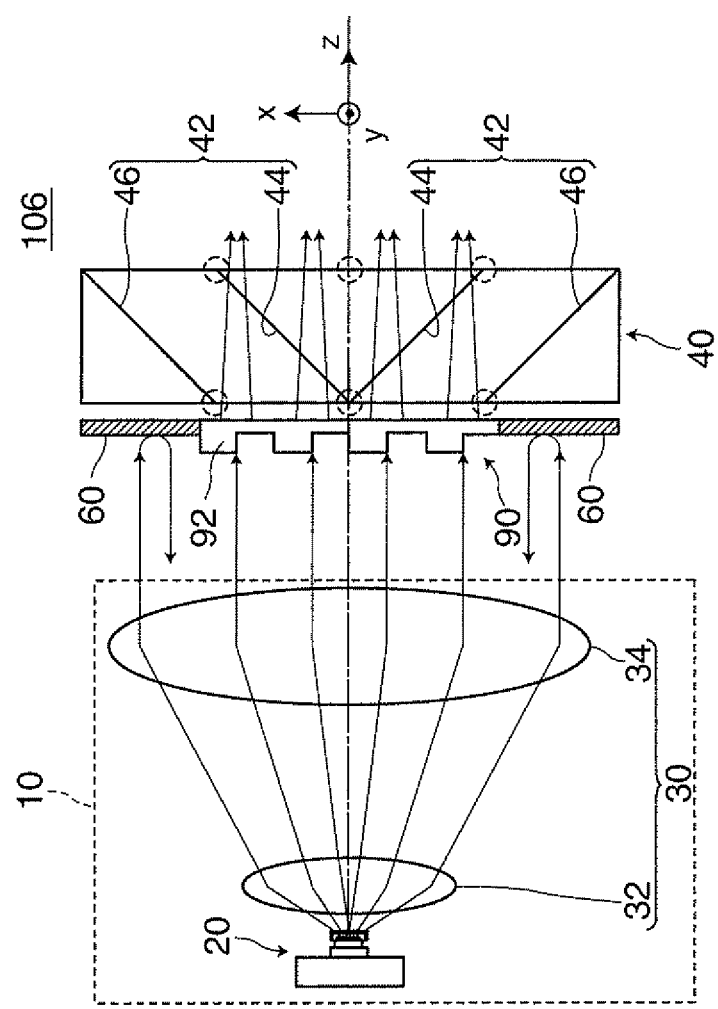
FIG. 6 is a diagram for explaining an illumination device in a fourth embodiment of the invention.

FIG. 6 is a diagram for explaining an illumination device 106 in a fourth embodiment.

A projector 1006 (not shown) according to the fourth embodiment basically has a configuration substantially the same as that of the projector 1000 according to the first embodiment, but is different from the projector 1000 according to the first embodiment in the configuration of the light diffusing unit. As shown in FIG. 6, the light diffusing unit 90 has a plurality of light diffusing sections 92. The light diffusing sections 92 are each different in cross-sectional shape from the light diffusing section 52 in the first embodiment. Specifically, one of the plurality of light diffusing sections 92 has a rectangular cross-sectional shape viewed in the cross-section perpendicular to the direction in which the one light diffusing section extends.

As described above, according to the projector 1006 related to the fourth embodiment, similarly to the projector 1000 according to the first embodiment, since there is provided the light diffusing unit 90 disposed in the upstream of the polarization conversion element 40, it becomes possible to reduce the influence of the discontinuous portions of the polarization conversion element 40, and thus it becomes possible to reduce the phenomenon that the illumination unevenness occurs in the projection image projected on the screen.

Further, according to the projector 1006 related to the fourth embodiment, similarly to the projector 1000 according to the first embodiment, it becomes possible to efficiently mix the light not blocked by the discontinuous portions of the polarization conversion element 40 and the light blocked by the discontinuous portions of the polarization conversion element 40 with each other. As a result, it becomes possible to further reduce the phenomenon that the illumination unevenness occurs in the projection image projected on the screen.

It should be noted that the projector 1006 according to the fourth embodiment has substantially the same configuration as that of the projector 1000 according to the first embodiment except for the configuration of the light diffusing unit, and therefore, obtains the corresponding advantages out of the advantages exerted by the projector 1000 according to the first embodiment without change.

Fifth Embodiment

FIG. 7 is a diagram showing a substantial part of a projector according to a fifth embodiment. Since the projector according to the fifth embodiment basically has a configuration substantially the same as that of the projector according to the first embodiment, the difference from the first embodiment will mainly be explained here, and the explanation for substantially the same items will be omitted.

The projector according to the fifth embodiment has a configuration substantially the same as in the first embodiment except for the point that a reflecting unit 150 is disposed between the polarization conversion element 40 and the liquid crystal light modulation device 200 as an illumination object.

As shown in FIG. 7, the reflecting unit 150 is for reflecting the illumination light, which proceeds toward the outside of the irradiation area 200A (a display area where a plurality of pixels is arranged in a matrix) of the liquid crystal light modulation device 200, toward the inside of the irradiation area 200A. As shown in FIG. 2A, a part of the light diffused by the light diffusing unit 50 proceeds toward the outside of the irradiation area 200A of the liquid crystal light modulation device 200. The light having reached the outside of the irradiation area 200A does not make a contribution to the brightness of the irradiation area 200A, and therefore, provides cause of generating in particular the illumination unevenness which makes the periphery of the illumination area 200A darker.

In contrast, by disposing the reflecting unit 150 for reflecting the illumination light, which proceeds toward the outside of the irradiation area 200A of the liquid crystal light modulation device 200, toward the inside of the irradiation area 200A between the polarization conversion element 40 and the liquid crystal light modulation device 200, it is possible to illuminate the periphery of the irradiation area 200A effectively using the illumination light reflected inward by the reflecting unit 150. Thus, such an illumination unevenness as described above can be eliminated, and it becomes possible to display a high-quality image.

As the reflecting unit 150, it is possible to adopt a hollow member (a light tunnel) obtained by disposing a reflecting film such as a metal film on the inner surface of a prismatic cylindrical body, or a rod lens having a rectangular cross-sectional shape. Such reflecting units are each disposed so that one end (one of opening sections) thereof faces to the light exit surface of the polarization conversion element 40, and the other end (the other of the opening sections) faces to the irradiation area 200A of the liquid crystal light modulation device 200. Among these reflecting units, the hollow member is preferably used as the reflecting unit 150. Since air has longer air-equivalent optical path length than glass or the like constituting the rod lens, by using the hollow reflecting unit having air as the medium of the reflected light, the display shadows (shadows each having a linear shape and corresponding respectively to the edges of the polarization separation sections 44) of the discontinuous portions of the polarization conversion element 40 can be prevented from appearing in the irradiation area 200A.

In the reflecting unit 150 of the hollow type, the reflecting film is preferably provided with a scattering property in at least a partial area. Thus, since the light having entered the surface of the reflecting film is reflected in diverse directions, it is possible to uniformly illuminate the periphery or the like of the irradiation area 200A without a unevenness using these reflected lights. As the reflecting film superior in scattering property, there can be cited an aluminum coat, Miro Silver (product name, made by ALANOD Ltd.), and so on.

FIG. 8 shows a modified example of the reflecting unit. In the present modified example, the lateral length of the light exit surface of the polarization conversion element 40 is larger than the lateral length of the irradiation area 200A. The reflecting unit 150 has reflecting surfaces 150A. The reflecting surfaces 150A are disposed obliquely to the illumination light axis 100ax (see FIGS. 1A and 1B) so as to be aligned with the side surfaces of the polarization conversion element 40. By disposing the reflecting surfaces in such a manner as described above, it is possible to make the lateral length of one end surface of the reflecting unit 150 roughly equal to the lateral length of the light exit surface of the polarization conversion element 40, and to make the lateral length of the other end surface of the reflecting unit 150 roughly equal to the lateral length of the irradiation area 200A. According to this configuration, since the aperture area of one opening section (the opening section facing to the light exit surface of the polarization conversion element 40) of the reflecting unit 150 is larger than the aperture area of the other opening section (the opening section facing to the irradiation area 200A of the liquid crystal light modulation device 200), it is possible to make the light density in the irradiation area 200A higher than the light density in the light exit surface of the polarization conversion element 40 to thereby increase the luminance of the display image.

It should be noted that in the light exit surface of the polarization conversion element 40 and the one end surface of the reflecting unit 150, the dimension made to be greater than those of the irradiation area 200A and the other end surface of the reflecting unit 150 is not limited to the lateral dimension, but can be the vertical dimension, or both of vertical and lateral dimensions.

Figure 9A:
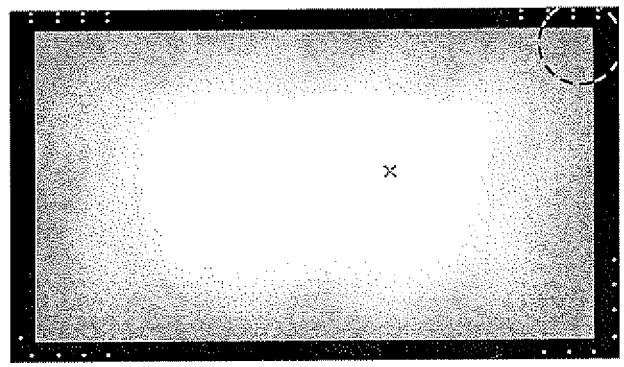
FIGS. 9A through 9C are diagrams showing the brightness of an irradiation area of a liquid crystal light modulation device in the case of disposing a reflecting unit between a polarization conversion element and the liquid crystal light modulation device and in the case of disposing no reflecting unit.
Figure 9B:
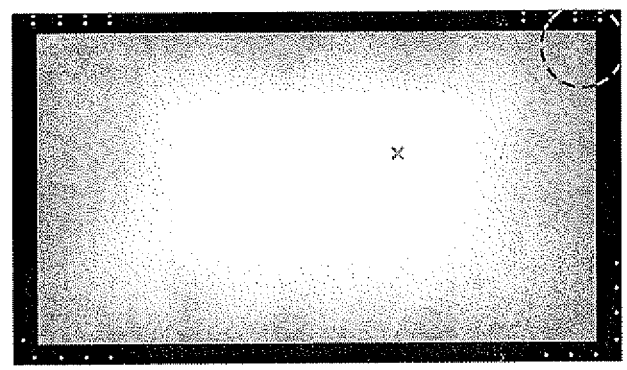
Figure 9C:
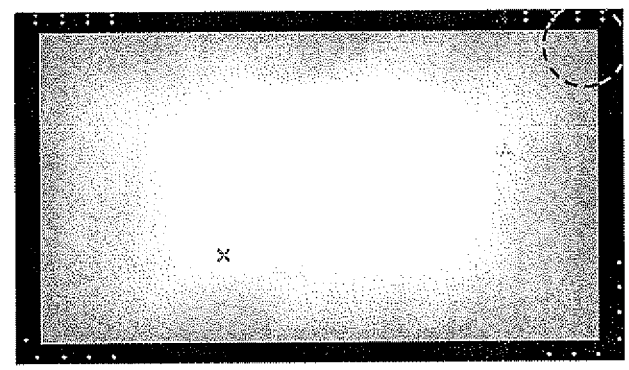

FIGS. 9A through 9C are diagrams showing the brightness of the irradiation area 200A of the liquid crystal light modulation device 200 in the case of disposing the reflecting unit 150 between the polarization conversion element 40 and the liquid crystal light modulation device 200 and in the case of disposing no reflecting unit. FIG. 9A is a diagram showing the distribution of the brightness of the irradiation area 200A in the case of not disposing the reflecting unit 150 between the polarization conversion element 40 and the liquid crystal light modulation device 200, FIG. 9B is a diagram showing the distribution of the brightness of the irradiation area 200A in the case of disposing the reflecting unit 150 shown in FIG. 7 between the polarization conversion element 40 and the liquid crystal light modulation device 200, and FIG. 9C is a diagram showing the distribution of the brightness of the irradiation area 200A in the case of disposing the reflecting unit 150 shown in FIG. 8 between the polarization conversion element 40 and the liquid crystal light modulation device 200.

When comparing FIGS. 9A and 9B with each other, the illumination unevenness which makes the periphery of the irradiation area darker is reduced in FIG. 9B compared to the case shown in FIG. 9A. Further, when comparing between FIGS. 9B and 9C, the periphery of the irradiation area is made much brighter in FIG. 9C compared to the case shown in FIG. 9B, and roughly uniform brightness is realized throughout the entire irradiation area. In particular, the brightness of the corner portion of the irradiation area indicated by the dotted line in the drawings is improved in the cases shown in FIGS. 9B and 9C, and the improvement effect is particularly significant in the case shown in FIG. 9C. Since the light entering the corner portions of the irradiation area has the longest optical path length, the brightness of the irradiation area is apt to be darker. However, in the case shown in FIG. 9C, this point is significantly improved, and the extremely uniform brightness is realized throughout the entire irradiation area. As described above, it is possible to confirm that the preferable illumination image with little unevenness can be obtained in the projectors according to the fifth embodiment and the modified example thereof, since the reflecting unit 150 is used.

Sixth Embodiment

Figure 10:
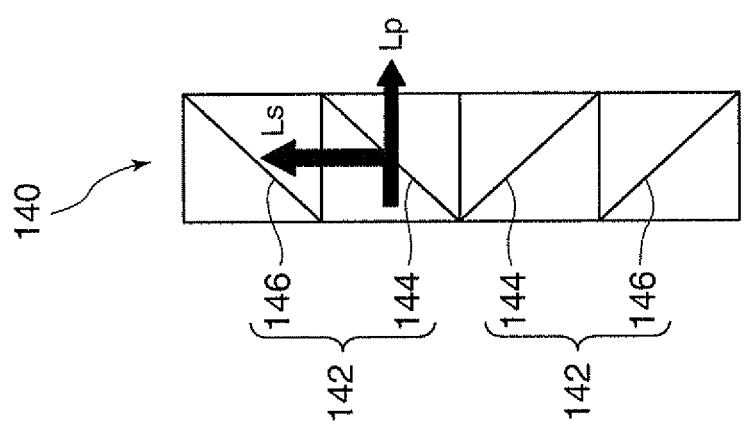
FIG. 10 is a diagram showing a polarization conversion element of a projector according to a sixth embodiment of the invention.

FIG. 10 is a diagram showing a polarization conversion element of a projector according to a sixth embodiment. Since the projector according to the sixth embodiment basically has a configuration substantially the same as that of the projector according to the first embodiment, the difference from the first embodiment will mainly be explained here, and the explanation for substantially the same items will be omitted.

The polarization conversion element 140 is provided with polarization separation sections 144 each for transmitting a first linearly polarized component Lp while reflecting a second linearly polarized component Ls among the polarization components included in the incident light having entered the polarization conversion element 140, reflecting sections 146 each for reflecting the second linearly polarized component Ls, which has been reflected by corresponding one of the polarization separation sections 144, in a direction (a direction parallel to the illumination light axis) parallel to the transmission direction of the first linearly polarized component Lp, and a wave plate (not shown) for converting one of the first linearly polarized component Lp and the second linearly polarized component Ls into the other thereof. A polarization conversion section 142 is composed of one polarization separation section 144 and one reflecting section 146, and the polarization conversion element 140 is composed of a plurality of (two in the present embodiment) such polarization conversion sections 142 arranged one-dimensionally.

The first linearly polarized component Lp is, for example, a polarization component entering the polarization separation section 144 of the polarization conversion element 140 as p-polarized light, and the second linearly polarized component Ls is, for example, a polarization component entering the polarization separation section 144 of the polarization conversion element 140 as s-polarized light. The wave plate can also be disposed in an area (a first area) overlapping the polarization separation section 144 viewed from a direction parallel to the illumination light axis out of the light exit surface of the polarization conversion element 140, or can also be disposed in an area (a second area) overlapping the reflecting section 146 viewed from a direction parallel to the illumination light axis out of the light exit surface of the polarization conversion element 140.

In the case of the present embodiment, the reflectance Rs (the proportion of the light intensity of the second linearly polarized component Ls reflected by the polarization separation section 144 to the light intensity of the incident light) of the second linearly polarized component Ls in the polarization separation section 144 is higher than the transmittance Tp (the proportion of the light intensity of the first linearly polarized component Lp transmitted through the polarization separation section 144 to the light intensity of the incident light) of the first linearly polarized component Lp in the polarization separation section 144. For example, the difference between the reflectance Rs of the second linearly polarized component Ls in the polarization separation section 144 and the transmittance Tp of the first linearly polarized component Lp in the polarization separation section 144 is higher than 0% and lower than 15%. The transmittance Tp and the reflectance Rs of the polarization separation section 144 can be adjusted by adjusting the element such as the material of each layer, the film thickness, or the number of laminated layers of the dielectric multilayer film constituting the polarization separation section 144. In the present embodiment, the transmittance Tp of the first linearly polarized component Lp is set to be higher than 35% and lower than 50%, and the reflectance Rs of the second linearly polarized component Ls is set to 50% by appropriately adjusting these elements. Specifically, the difference between the reflectance of the second linearly polarized component Ls in the polarization separation section 144 and the transmittance of the first linearly polarized component Lp in the polarization separation section 144 is set to be higher than 0% and lower than 15%.

In the present embodiment, by adopting such a configuration, it is possible to approximate the brightness (the luminance of the light emitted from the second area) of the area illuminated by the second linearly polarized component Ls having a relatively long optical path length to the brightness (the luminance of the light emitted from the first area) of the area illuminated by the first linearly polarized component Lp having a relatively short optical path length, and as a result, the uniform brightness can be realized throughout the entire irradiation area of the liquid crystal light modulation device.

Specifically, since the second linearly polarized component Ls is reflected by the polarization separation section 144, and is then reflected by the reflecting section 146 to thereby be emitted in the same direction as the first linearly polarized component Lp, the optical path length of the second linearly polarized component Ls is longer than the optical path length of the first linearly polarized component Lp. Since the longer the optical path length of the illumination light is, the lower the brightness level of the irradiation area is to following the law of illumination, if the transmittance Tp of the first linearly polarized component Lp in the polarization separation section 144 is made equal to the reflectance Rs of the second linearly polarized component Ls in the polarization separation section 144, the brightness of the irradiation area corresponding to the second linearly polarized component Ls becomes lower than the brightness of the irradiation area corresponding to the first linearly polarized component Lp. Here, the irradiation area corresponding to the second linearly polarized component Ls denotes the area irradiated with the light reflected by the polarization separation section 144, and the irradiation area corresponding to the first linearly polarized component Lp denotes the area irradiated with the light transmitted through the polarization separation section 144. In the present embodiment, since the reflectance Rs of the second linearly polarized component Ls in the polarization separation section 144 is set to be higher than the transmittance Tp of the first linearly polarized component Lp in the polarization separation section 144, it is possible to approximate the brightness in the irradiation area corresponding to the second linearly polarized component Ls to the brightness in the irradiation area corresponding to the first linearly polarized component Lp. Therefore, it is possible to realize the roughly uniform brightness throughout the entire irradiation area of the liquid crystal light modulation device.

Figure 11A:
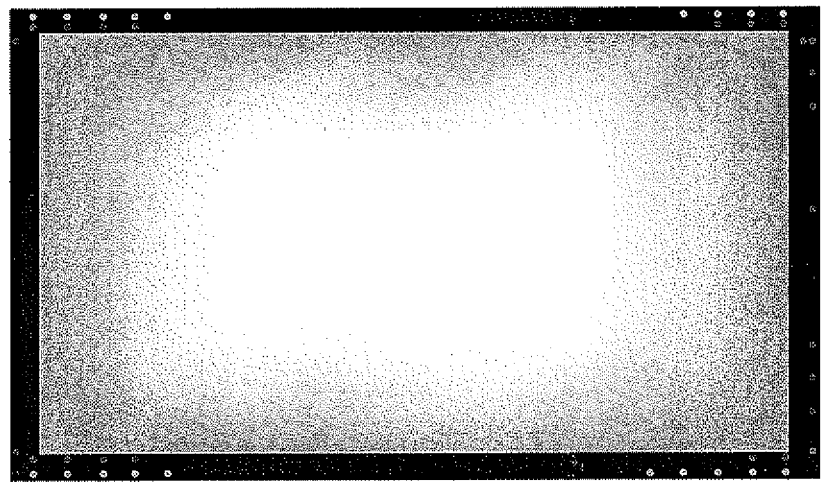
FIGS. 11A and 11B are diagrams showing the brightness of an irradiation area of a liquid crystal light modulation device in the case of equalizing the transmittance of a first linearly polarized component and the reflectance of a second linearly polarized component of the polarization separation section each other, and in the case of not equalizing them.
Figure 11B:
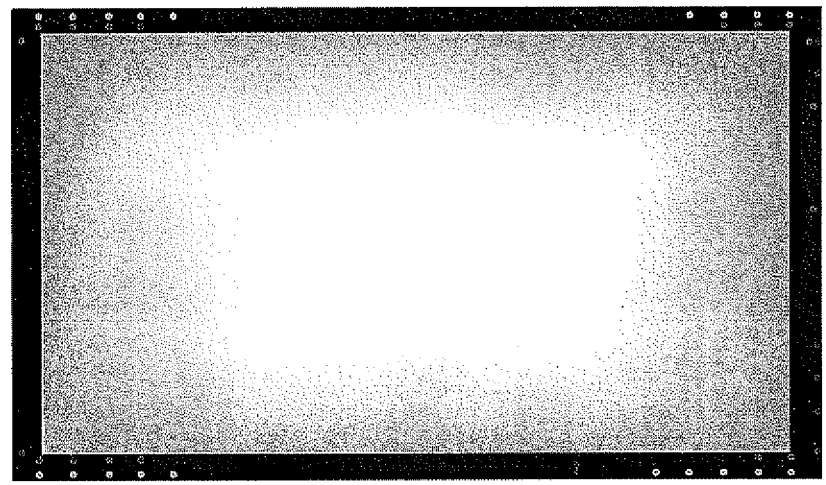

FIGS. 11A and 11B are diagrams showing the brightness of the irradiation area of the liquid crystal light modulation device in the case of equalizing the transmittance Tp of the first linearly polarized component Lp and the reflectance Rs of the second linearly polarized component Ls each other, and in the case of not equalizing them. FIG. 11A is a diagram showing the distribution of the brightness of the irradiation area in the case of making the transmittance Tp and the reflectance Rs equal to each other, and FIG. 11B is a diagram showing the distribution of the brightness of the irradiation area in the case of making the transmittance Tp lower than the reflectance Rs.

When comparing FIGS. 11A and 11B with each other, the illumination unevenness which makes the periphery of the irradiation area darker is reduced in FIG. 11B compared to the case shown in FIG. 11A. As described above, it is possible to confirm that the preferable illumination image with little unevenness can be obtained in the projector according to the sixth embodiment by appropriately adjusting the transmittance Tp and the reflectance Rs of the polarization separation section 144.

Although the invention is explained hereinabove based on the embodiments described above, the invention is not limited to the embodiments described above. The invention can be put into practice in various forms within the scope and spirit of the invention, and the following modifications are also possible, for example.

(1) The dimensions, the number, the material, and the shape of each of the constituents described in each of the embodiments are only for illustrative purposes, and can be modified within the range in which the advantages of the invention are preserved.

Figure 12:
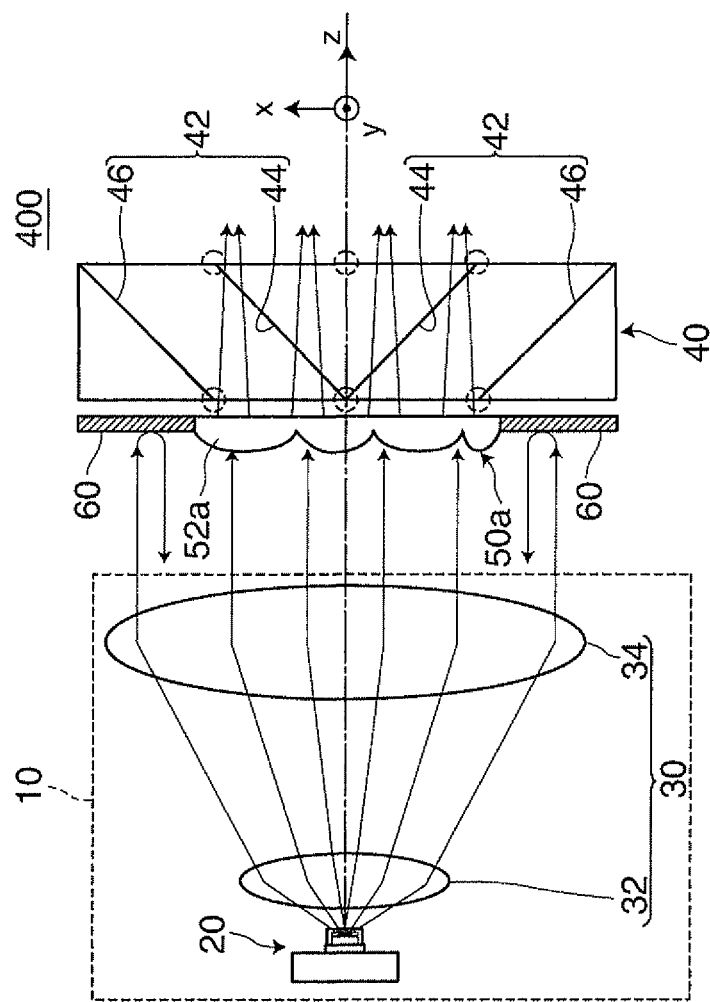
FIG. 12 is a diagram for explaining an illumination device in a first modified example.
Figure 13:
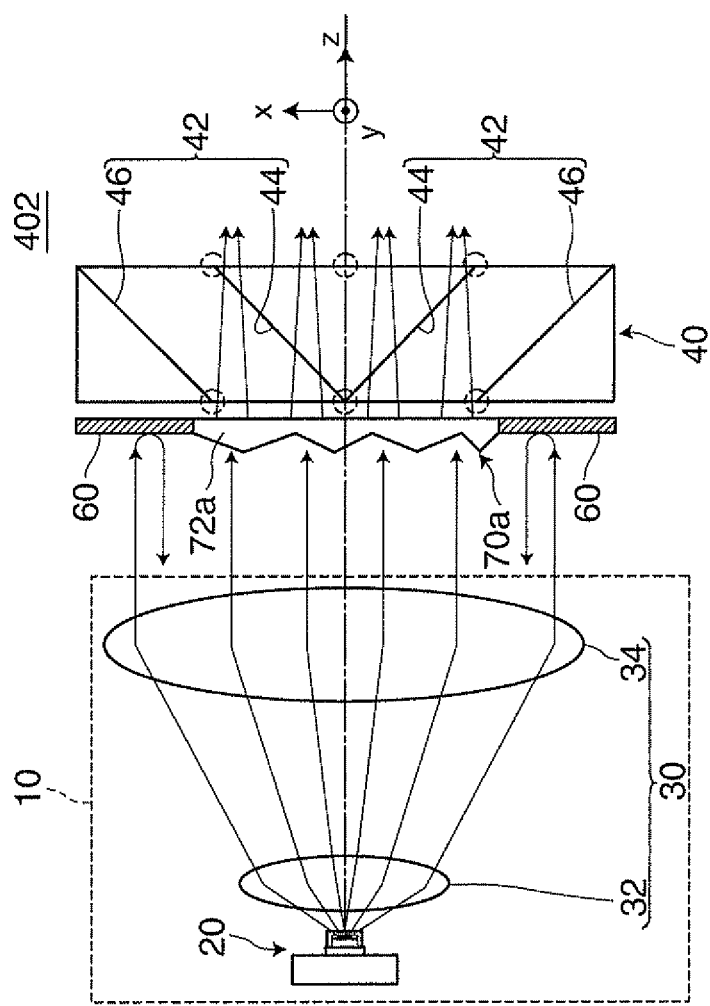
FIG. 13 is a diagram for explaining an illumination device in a second modified example.
Figure 14:
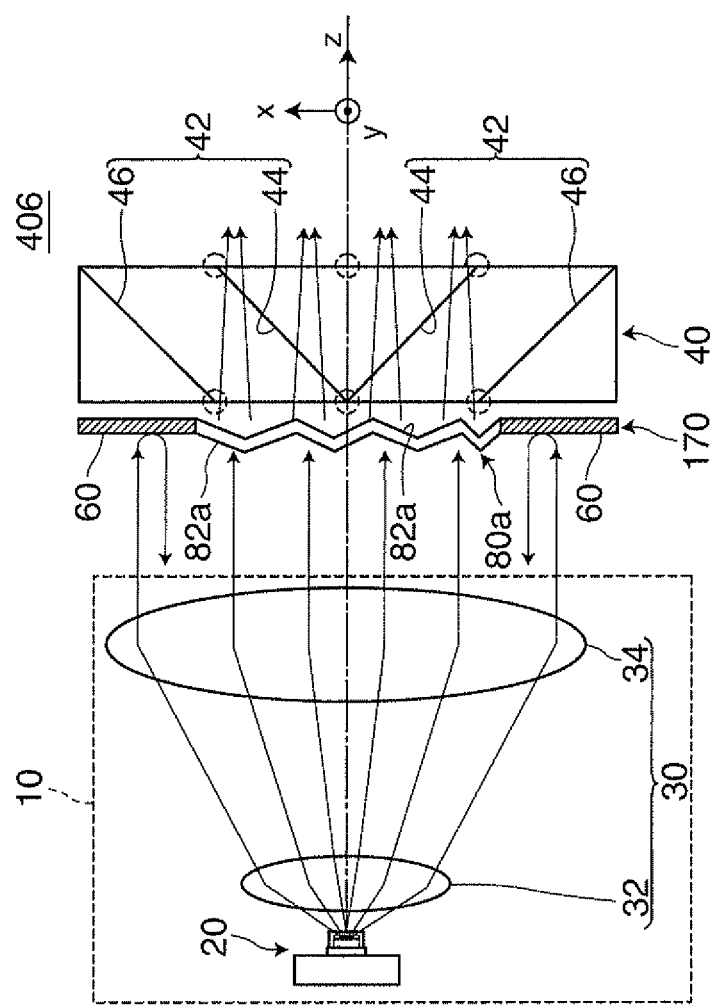
FIG. 14 is a diagram for explaining an illumination device in a third modified example.
Figure 15:
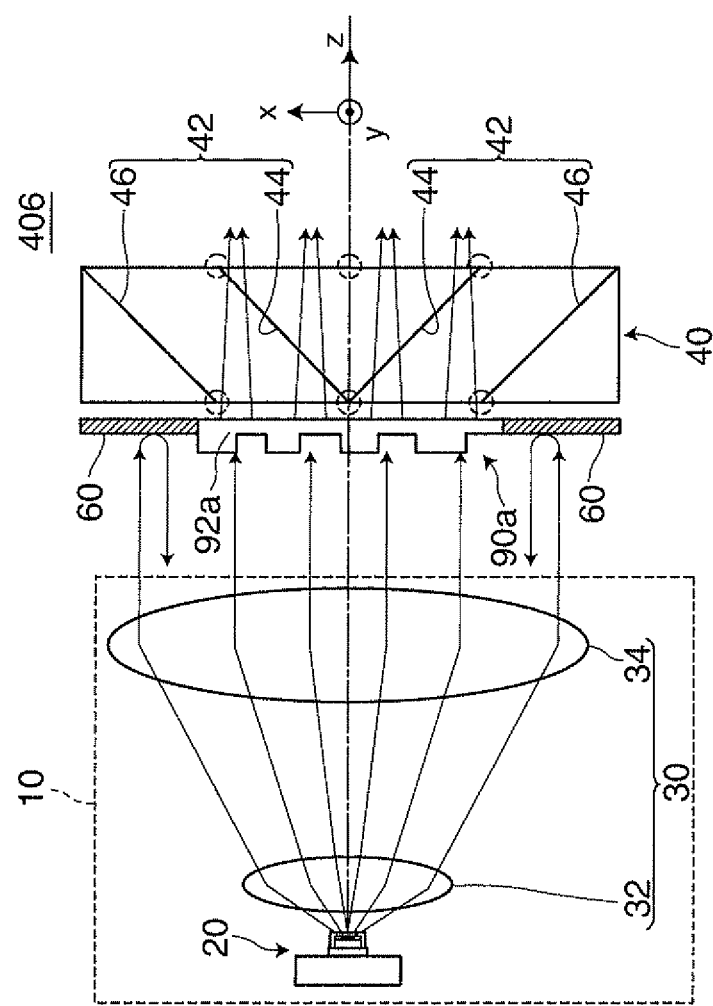
FIG. 15 is a diagram for explaining an illumination device in a fourth modified example.

(2) Although in each of the embodiments described above the plurality of light diffusing sections in the light diffusing unit is arranged at regular intervals, the invention is not limited thereto. FIG. 12 is a diagram for explaining an illumination device 400 in a first modified example. FIG. 13 is a diagram for explaining an illumination device 402 in a second modified example. FIG. 14 is a diagram for explaining an illumination device 404 in a third modified example. FIG. 15 is a diagram for explaining an illumination device 406 in a fourth modified example.

For example, as shown in FIGS. 12 through 15, the plurality of light diffusing sections can be arranged at random intervals along the arrangement direction of the polarization conversion sections 42. On this occasion, the widths of the light diffusing sections in the arrangement direction of the polarization conversion sections 42 can be set to the values corresponding respectively to the random intervals. Also by adopting such a configuration, it becomes possible to efficiently mix the light not blocked by the discontinuous portions of the polarization conversion element and the light blocked by the discontinuous portions of the polarization conversion element with each other.

(3) Although in the first, second, and fourth embodiments and the first, second, and fourth modified examples, the light diffusing unit has the plurality of light diffusing sections on the surface of the light diffusing unit facing to the light source device, the invention is not limited thereto. For example, it is possible to provide the plurality of light diffusing sections to the surface of the light diffusing unit facing to the light modulation device. Also by adopting such a configuration, it becomes possible to efficiently mix the light not blocked by the discontinuous portions of the polarization conversion element and the light blocked by the discontinuous portions of the polarization conversion element with each other. As a result, it becomes possible to further reduce the phenomenon that the illumination unevenness occurs in the projection image projected on the screen.

(4) Although in each of the embodiments described above the light diffusing unit is disposed in the upstream of the polarization conversion element, the invention is not limited thereto. For example, it is possible to dispose the light diffusing unit in the downstream of the polarization conversion element, or to dispose the light diffusing units in both of the upstream and the downstream of the polarization conversion element.

(5) Although in each of the embodiments described above, the light source device 10 emitting the "light which can be used as the white light" is adopted, the invention is not limited thereto. It is also possible to adopt a light source device emitting light (e.g., the light including specific colored light component at a higher proportion) other than the "light which can be used as the white light."

(6) Although in each of the embodiments described above the white light emitting diode 20 is used as the light source, the invention is not limited thereto. It is also possible to use, for example, a solid-state light source formed of a semiconductor laser as the light source. Further, it is also possible to use a light source other than solid-state light sources.

(7) Although in each of the embodiments described above the transmissive projector is used, the invention is not limited thereto. It is also possible to use, for example, a reflective projector.

(8) Although in each of the embodiments described above the explanation is presented showing, as an example, the projector using a single light modulation device, the invention is not limited thereto. The invention can be applied to a projector using two or more light modulation devices. For example, in the case of using the light modulation device for the red light, the light modulation device for the blue light, and the light modulation device for the green light, it is sufficient to dispose a known color separation optical system in, for example, the downstream of the polarization conversion element.

(9) The invention can be applied to a front projection projector for performing projection from the side of observing the projected image, and also to a rear projection projector for performing projection from the side opposite to the side of observing the projected image.

(10) Although in each of the embodiments described above the light diffusing unit disposed between the collimating optical system 30 and the polarization conversion element 40 is used, the invention is not limited thereto. For example, the light diffusing unit can also be disposed directly on the light entrance surface or the light exit surface of the polarization conversion element 40.

(11) Although in each of the embodiments described above the light diffusing unit has a property of diffusing the light only in the direction along the arrangement direction of the polarization conversion sections 42, the invention is not limited thereto. For example, the light diffusing unit can also have a property of diffusing the light not only in the arrangement direction of the polarization conversion sections 42, but also in a direction perpendicular to the arrangement direction of the polarization conversion sections 42. On this occasion, the diffusing power of the light diffusing unit in the direction perpendicular to the arrangement direction of the polarization conversion sections 42 is preferably lower than the diffusing power of the light diffusing unit in the arrangement direction of the polarization conversion sections 42. This is because, the contribution of the light diffusion in the direction perpendicular to the arrangement direction of the polarization conversion sections 42 to the reduction of the influence of the discontinuous portions of the polarization conversion element is smaller than the contribution of the light diffusion in the arrangement direction of the polarization conversion sections 42 to the reduction of the influence of the discontinuous portions of the polarization conversion element, and the light diffusion in the direction perpendicular to the arrangement direction of the polarization conversion sections 42 rather deteriorates the efficiency of the light emitted from the light source device 10.

The entire disclosure of Japanese Patent Application No.: 2011-194661, filed on Sep. 7, 2011 and 2011-052621, filed on Mar. 9, 2012 are expressly incorporated by reference herein.

What is claimed is:
1. A projector comprising:
an illumination device including:
a light source device emitting light, a polarization conversion element adapted to emit light from the light source device as polarized light and having a plurality of polarization conversion sections arranged in an arrangement direction, each of the polarization conversion sections having a polarization separation section and a reflecting section, and a light diffusing unit disposed in at least one of upstream and downstream of the polarization conversion element and having a plurality of light diffusing sections;

a light modulation device adapted to modulate light from the illumination device in accordance with image information; and a projection optical system adapted to project light from the light modulation device, wherein a width of each of the light diffusing sections in the arrangement direction is smaller than a width of each of the polarization separation sections in the arrangement direction.

2. The projector according to claim 1, wherein
the light diffusing unit diffuses light along the arrangement direction.

3. The projector according to claim 2, wherein
each of the light diffusing sections extends in a direction, which is perpendicular to an optical axis of the illumination device and is perpendicular to the arrangement direction, and is disposed on at least one of a surface of the light diffusing unit facing to the light source device and a surface of the light diffusing unit facing to the light modulation device, and one of the plurality of light diffusing sections has a roughly semicircular cross-sectional shape viewed in a cross-section perpendicular to the direction in which the one of the light diffusing sections extends.

4. The projector according to claim 2, wherein
each of the light diffusing sections extends in a direction, which is perpendicular to an optical axis of the illumination device and is perpendicular to the arrangement direction, and is disposed on at least one of a surface of the light diffusing unit facing to the light source device and a surface of the light diffusing unit facing to the light modulation device, and one of the plurality of light diffusing sections has a triangular cross-sectional shape viewed in a cross-section perpendicular to the direction in which the one of the light diffusing sections extends.

5. The projector according to claim 2, wherein
each of the light diffusing sections extends in a direction, which is perpendicular to an optical axis of the illumination device and is perpendicular to the arrangement direction, and is disposed on at least one of a surface of the light diffusing unit facing to the light source device and a surface of the light diffusing unit facing to the light modulation device, and one of the plurality of light diffusing sections has a rectangular cross-sectional shape viewed in a cross-section perpendicular to the direction in which the one of the light diffusing sections extends.

6. The projector according to claim 3, wherein
the plurality of light diffusing sections are arranged at regular intervals along the arrangement direction.

7. The projector according to claim 3, wherein
the plurality of light diffusing sections are arranged at random intervals along the arrangement direction.

8. The projector according to claim 2, wherein
a number of the plurality of light diffusing sections is equal to or larger than twice of a number of the polarization conversion sections.

9. The projector according to claim 2, wherein
the polarization conversion element has two polarization conversion sections.

10. The projector according to claim 1, further comprising:
a reflecting unit adapted to reflect light, which proceeds toward outside of an irradiation area of the light modulation device, to inside of the irradiation area, and disposed between the polarization conversion element and the light modulation device.

11. The projector according to claim 10, wherein
the reflecting unit has a prismatic cylindrical shape having an inner surface formed as a reflecting surface, and is disposed so that one opening section faces to a light exit surface of the polarization conversion element and an other opening section faces to the irradiation area of the light modulation device.

12. The projector according to claim 11, wherein
an aperture area of the one opening section of the reflecting unit is larger than an aperture area of the other opening section.

13. The projector according to claim 10, wherein
at least a part of the reflecting surface of the reflecting unit has a scattering property.

14. The projector according to claim 1, wherein
each of the polarization separation sections is adapted to transmit a first linearly polarized component and reflect a second linearly polarized component among the polarization components included in the incident light having entered the polarization conversion element, each of the reflecting sections is adapted to reflect the second linearly polarized component, which has been reflected by the polarization separation section, in a direction parallel to a transmission direction of the first linearly polarized component, and the polarization conversion element includes
a wave plate adapted to convert one of the first linearly polarized component and the second linearly polarized component into the other of the first linearly polarized component and the second linearly polarized component, and a reflectance of the second linearly polarized component in the polarization separation section is higher than a transmittance of the first linearly polarized component in the polarization separation section.

15. The projector according to claim 14, wherein
a difference between the reflectance of the second linearly polarized component in the polarization separation section and the transmittance of the first linearly polarized component in the polarization separation section is higher than 0% and lower than 15%.

* * * * *